United States Patent
Chun et al.

(10) Patent No.: US 8,190,144 B2
(45) Date of Patent: May 29, 2012

(54) EFFECTIVE SYSTEM INFORMATION RECEPTION METHOD

(75) Inventors: Sung-Duck Chun, Gyeonggi-Do (KR); Young-Dae Lee, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 962 days.

(21) Appl. No.: 12/143,607

(22) Filed: Jun. 20, 2008

(65) Prior Publication Data
US 2008/0318566 A1      Dec. 25, 2008

Related U.S. Application Data

(60) Provisional application No. 60/945,340, filed on Jun. 20, 2007, provisional application No. 60/955,651, filed on Aug. 14, 2007.

(30) Foreign Application Priority Data

Jun. 18, 2008 (KR) ........................ 10-2008-0057283

(51) Int. Cl.
*H04W 4/00* (2009.01)
*H04M 1/663* (2006.01)

(52) U.S. Cl. .................... 455/422.1; 455/412.2; 455/450

(58) Field of Classification Search ............... 455/422.1, 455/450, 464, 509; 370/310, 322, 329, 348
See application file for complete search history.

(56) References Cited

U.S. PATENT DOCUMENTS

| | | | |
|---|---|---|---|
| 5,878,041 A | 3/1999 | Yamanaka et al. | |
| 6,445,917 B1 | 9/2002 | Bark et al. | |
| 6,594,240 B1 | 7/2003 | Chuah et al. | |
| 6,728,918 B1 | 4/2004 | Ikeda et al. | |
| 6,738,624 B1 | 5/2004 | Aksentijevic et al. | |
| 6,862,450 B2 | 3/2005 | Mikola et al. | |
| 6,874,113 B2 | 3/2005 | Chao et al. | |
| 6,967,936 B1 | 11/2005 | Laroia et al. | |
| 7,171,163 B2 | 1/2007 | Terry et al. | |
| 7,180,885 B2 | 2/2007 | Terry | |
| 7,181,667 B2 | 2/2007 | Argyropoulos et al. | |
| 7,227,856 B2 | 6/2007 | Wu | |
| 7,227,857 B2 | 6/2007 | Kuo | |
| 7,227,868 B2 | 6/2007 | Inden | |
| 7,295,573 B2 | 11/2007 | Yi et al. | |

(Continued)

FOREIGN PATENT DOCUMENTS

CN      1613210      5/2005

(Continued)

OTHER PUBLICATIONS

ZTE, "Redundant Retransmission Restraint in RLC-AM," R2-061234, 3GPP TSG RAN WG2 Meeting #53, May 2006, XP-050131180.

European Telecommunications Standards Institute (ETSI), "Digital Cellular Telecommunications System (Phase 2+); Functional Stage 2 Description of Location Services (LCS) in Geran (Release 7)," ETSI TS 143 059, v7.3.0, May 2007, XP-014038519.

Sadayuki Abeta, et al.: "Super 3G Technology Trends. Part 2: Research on Super 3G Technology", NTT DoCoMo Technical Journal, vol. 8, No. 3, pp. 55-62, Dec. 2006.

Nokia: "System Information Distribution", 3GPP TSG-RAN WG2 Ad Hoc Meeting on LTE, R2-061487, Cannes, France, pp. 1-3, Jun. 27-30, 2006.

(Continued)

*Primary Examiner* — Michael Thier
(74) *Attorney, Agent, or Firm* — Lee, Hong, Degerman, Kang & Waimey

(57) ABSTRACT

Disclosed is the method for informing, by a wireless communication system, to a terminal about information required for reception when the terminal is connected to the wireless communication system, in which a base station updates system information according to a preset period, and the terminal efficiently receives or checks any update of the system information based on the period.

23 Claims, 6 Drawing Sheets

U.S. PATENT DOCUMENTS

| | | |
|---|---|---|
| 7,313,116 B2 | 12/2007 | Lee et al. |
| 7,706,410 B2 | 4/2010 | Chun et al. |
| 7,710,930 B2 | 5/2010 | Kwak |
| 7,817,595 B2 | 10/2010 | Wu |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0022213 A1 | 2/2004 | Choi et al. |
| 2004/0076182 A1 | 4/2004 | Wu |
| 2004/0103435 A1* | 5/2004 | Yi et al. ............ 725/81 |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2005/0020260 A1 | 1/2005 | Jeong et al. |
| 2005/0020620 A1 | 1/2005 | Weigl et al. |
| 2005/0039101 A1 | 2/2005 | Torsner |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen |
| 2005/0083943 A1 | 4/2005 | Lee et al. |
| 2005/0094596 A1 | 5/2005 | Pietraski et al. |
| 2005/0096017 A1 | 5/2005 | Kim |
| 2005/0118992 A1 | 6/2005 | Jeong et al. |
| 2005/0147040 A1 | 7/2005 | Vayanos et al. |
| 2005/0164683 A1* | 7/2005 | Roberts et al. ............ 455/412.2 |
| 2005/0193309 A1 | 9/2005 | Grilli et al. |
| 2005/0201354 A1 | 9/2005 | Hosaka et al. |
| 2005/0237932 A1 | 10/2005 | Liu |
| 2005/0238051 A1 | 10/2005 | Yi et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0287957 A1 | 12/2005 | Lee et al. |
| 2006/0007886 A1 | 1/2006 | Lee et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0097913 A1 | 5/2007 | Hanov |
| 2007/0104141 A1 | 5/2007 | Park et al. |
| 2007/0189205 A1 | 8/2007 | Terry et al. |
| 2007/0201397 A1 | 8/2007 | Zhang |
| 2007/0268861 A1 | 11/2007 | Diachina et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0051098 A1 | 2/2008 | Rao |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0198869 A1 | 8/2008 | Jiang |
| 2008/0268878 A1 | 10/2008 | Wang et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0046631 A1 | 2/2009 | Meylan et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0175163 A1 | 7/2009 | Sammour et al. |
| 2009/0259908 A1 | 10/2009 | Gollapudi |
| 2010/0014466 A1 | 1/2010 | Meyer et al. |
| 2011/0033048 A1 | 2/2011 | Stanwood et al. |
| 2011/0149865 A1 | 6/2011 | Lee et al. |

FOREIGN PATENT DOCUMENTS

| | | |
|---|---|---|
| EP | 1343267 A2 | 9/2003 |
| EP | 1508992 | 2/2005 |
| EP | 1509011 | 2/2005 |
| EP | 1689130 A1 | 8/2006 |
| EP | 1746855 A2 | 1/2007 |
| EP | 1768297 | 3/2007 |
| EP | 1768297 A2 | 3/2007 |
| EP | 1796405 | 6/2007 |
| EP | 2026523 | 2/2009 |
| JP | 1995162948 | 6/1995 |
| JP | 2001197021 | 7/2001 |
| JP | 2002198895 | 7/2002 |
| JP | 03115876 | 4/2003 |
| JP | 2003516021 | 5/2003 |
| JP | 2006311543 | 11/2006 |
| JP | 2007116639 | 5/2007 |
| JP | 2007312244 | 11/2007 |
| JP | 2009521893 | 6/2009 |
| KR | 2001-0045783 | 6/2001 |
| KR | 10-2001-0062306 | 7/2001 |
| KR | 2002-0004645 | 1/2002 |
| KR | 10-2002-0097304 A | 12/2002 |
| KR | 1020020097304 A | 12/2002 |
| KR | 10-2003-0012048 A | 2/2003 |
| KR | 1020030012048 A | 2/2003 |
| KR | 1020030060055 A | 7/2003 |
| KR | 10-2003-0068743 | 8/2003 |
| KR | 10-2003-0068743 A | 8/2003 |
| KR | 1020030087914 | 11/2003 |
| KR | 1020040034398 A | 4/2004 |
| KR | 20040039944 A | 5/2004 |
| KR | 10-2004-0072961 | 8/2004 |
| KR | 1020050022988 A | 3/2005 |
| KR | 10-2005-0062359 A | 6/2005 |
| KR | 20050062359 A | 6/2005 |
| KR | 10-2005-0081836 | 8/2005 |
| KR | 10-2005-0092874 A | 9/2005 |
| KR | 1020050092874 A | 9/2005 |
| KR | 10-2005-0099472 | 10/2005 |
| KR | 10-2005-0100882 | 10/2005 |
| KR | 1020050103127 | 10/2005 |
| KR | 10-2006-0004935 | 1/2006 |
| KR | 10-2006-0014910 | 2/2006 |
| KR | 10-2006-0029452 | 4/2006 |
| KR | 1020060042858 A | 5/2006 |
| KR | 1020060069378 A | 6/2006 |
| KR | 1020060079784 A | 7/2006 |
| KR | 1020060090191 A | 8/2006 |
| KR | 1020060134058 A | 12/2006 |

| | | |
|---|---|---|
| KR | 10-2007-0076374 | 7/2007 |
| RU | 2304348 | 8/2007 |
| WO | 0137473 | 5/2001 |
| WO | 03045103 A1 | 5/2003 |
| WO | 2004/042963 | 5/2004 |
| WO | 2004042953 | 5/2004 |
| WO | 2005039108 A2 | 4/2005 |
| WO | 2005/078967 | 8/2005 |
| WO | 2005122441 | 12/2005 |
| WO | 2005125226 A2 | 12/2005 |
| WO | 2006009714 | 1/2006 |
| WO | 2006/016785 | 2/2006 |
| WO | 2006/033521 | 3/2006 |
| WO | 2006/052086 | 5/2006 |
| WO | 2006046894 A1 | 5/2006 |
| WO | 2006083149 | 8/2006 |
| WO | 20061095385 | 9/2006 |
| WO | 2006/104335 | 10/2006 |
| WO | 2006/104342 | 10/2006 |
| WO | 2006118418 A2 | 11/2006 |
| WO | 20061118435 | 11/2006 |
| WO | 2007/020070 | 2/2007 |
| WO | 2007/024065 | 3/2007 |
| WO | 20071023364 | 3/2007 |
| WO | 2007/045505 | 4/2007 |
| WO | 2007039023 A1 | 4/2007 |
| WO | 2007/052900 | 5/2007 |
| WO | 2007066900 A1 | 6/2007 |
| WO | 2007/078155 | 7/2007 |
| WO | 2007/078174 | 7/2007 |
| WO | 2007078142 A1 | 7/2007 |
| WO | 2007078164 A1 | 7/2007 |
| WO | 2007078173 A1 | 7/2007 |
| WO | 2007/089797 | 8/2007 |
| WO | 2007/091831 | 8/2007 |
| WO | 2007/126793 | 11/2007 |
| WO | 2007/147431 | 12/2007 |
| WO | 2008/010063 | 1/2008 |
| WO | 2008004725 | 1/2008 |
| WO | 2008/094120 | 8/2008 |
| WO | 20091035301 | 3/2009 |

OTHER PUBLICATIONS

LG Electronics: "Delivery of LTE System Information", 3GPP TSG-RAN WG2 Ad Hoc on LTE, R2-061959, Cannes, France, pp. 1-4, Jun. 27-30, 2006.
LG Electronics Inc., "UE State Transition in LTE_ACTIVE," R2-061002, 3GPP TSG-RAN WG2 #52, Mar. 2006, XP-050130928.
Texas Instruments, "UL Synchronization Management and Maintenance in E-UTRA," R1-072198, 3GPP TSG RAN WG1 #49, May 2007, XP-050105936.
Texas Instruments, "UL Synchronization Management in LTE_ACTIVE," R1-071478, 3GPP TSG RAN WG1 #48bis, Mar. 2007, XP-050105413.
Motorola, "Contention-free Intra-LTE Handover," R2-070730, 3GPP TSG-RAN WG2 #57, Feb. 2007, XP-050133763.
Ericsson, "Scheduling Request in E-UTRAN," R1-070471, 3GPP TSG-RAN WG2 #47bis, Jan. 2007, XP-050104502.
Nokia, "Buffer Reporting for E-UTRAN," R2-060829, 3GPP TSG-RAN WG2 Meeting #52, Mar. 2006, XP-002503218.
Nokia, "Uplink Scheduling for VoIP," R2-070476, 3GPP TSG-RAN WG2 Meeting #57, Feb. 2007, XP-008125208.
Ghosh, A. et al.; "Random Access Design for UMTS Air-Interface Evolution"; Vehicular Technology Conference, 2007. VTC 2007-Spring. IEEE 65th; Apr. 22-25, 2007; pp. 1041-1045.
NEC "Optimized Buffer Status Reporting" 3GPP TSG-RAN WG#2 58bis meeting R2-072515, Jun. 2007.
Catt et al. "Consideration on UL buffer reporting" 3GPP TSG RAN WG2#55, r2-062934, Oct. 2006.
Ghosh, A. et al.; 'Random Access Design for UMTS Air-Interface Evolution'; Vehicular Technology Conference, 2007. VTC2007-Spring. IEEE 65th; Apr. 22-25, 2007; pp. 1041-1045.
Kashima, T., "Method and Apparatus for Providing Timing Alignment", U.S. Appl. No. 60/944,662, Jun. 18, 2007.
Lin, L.C., "Enhanced Random Access Response Formats in E-UTRA", U.S. Appl. No. 61/006,348, Jan. 8, 2008.
Wang, P.S., et al., "Operation of Control Protocol Data Units in Packet Data Convergence Protocol", U.S. Appl. No. 60/976,139, Sep. 28, 2007.
Mukherjee, R.P., et al., "Method and Apparatus of Performing Packet Data Convergence Protocol Reset", U.S. Appl. No. 61/019,058, Jan. 4, 2008.
NTT DoCoMo et al., "Scheduling Request Transmission Method for E-UTRA Uplink," R1-063301, 3GPP TSG RAN WG1 Meeting #47, Nov. 2006.
Motorola, "Synchronized Random Access Channel and Scheduling Request," R1-063046, 3GPP TSG RAN1#47, Nov. 2006.
Ericsson, "Basic Principles for the Scheduling Request in LTE," R2-062350, 3GPP TSG RAN WG2 #54, Aug. 2006.
Ericsson et al., "Framework for Scheduling Request and Buffer Status Reporting," R2-074691, TSG-RAN WG2 Meeting #60, Nov. 2007.
Ericsson, "Scheduling Request in E-UTRAN," 3GPP TSG-RAN #47bis, R1-070471, Jan. 2007.
Qualcomm Europe, "Further Details on RACH Procedure," 3GPP TSG-RAN WG1 #48, R1-070649, Feb. 2007.
NTT DoCoMo, Inc., "Buffer Status Report and Scheduling Request triggers," 3GPP TSG-RAN WG2 #59, R2-073574, Aug. 2007.
LG Electronics Inc., "Correction of status reporting coding," 3GPP TSG RAN WG2 #61, R2-080969, Feb. 2008, pp. 1-3, XP-002624626.
Alcatel-Lucent, "PDCP status report carrying LIS only," 3GPP TSG RAN WG2 #61, R2-080902, Jan. 2008, XP-050138711.
3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323, V8.2.1, May 2008, pp. 1-25, XP-050377638.
LG Electronics, "Correction to PDCP Status Report," 3GPP TSG RAN WG2 #61bis, R2-081594, Mar. 2008, pp. 1-8, XP-002624627.
Cohen, "An Improved SSCOP-like Scheme for Avoiding Unnecessary Retransmissions and Achieving Ideal Throughput," Proceedings of IEEE Infocom Conference on Computer Communications, pp. 855-862, Mar. 1996, XP-010158150.
3rd Generation Partnership Project, "Technical Specification Group Radio Access Network; Evolved Universal Terrestrial Radio Access (E-UTRA) Radio Link Control (RLC) protocol specification (Release 8)", 3GPP TS 36.322, V8.0.0, Dec. 2007.
NTT DOCOMO Inc "Miscellaneous corrections to TS 36.322", 3GPP TSG-RAN2 Meeting #61bis, R2-081700, Mar. 2008.
Ericsson, "Clarification to the handling of large RLC status reports", 3GPP TSG-RAN2 Meeting #61bis, R2-082018, Mar. 2008.
LG Electronics, et al., "ACK_SN setting for short Status PDU", 3GPP TSG-RAN WG2 #62, R2-082133, May 2008.
QUALCOMM Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Nokia Siemens Networks, "Update on Security, System Information, Mobility, MBMS and DRX", R2-073863, 3GPP TSG-RAN2 Meeting #59, Aug. 2007.
ASUSTeK, "On-line recovery of HFN synchronization due to RLC UM SN problem", R2-041940, 3GPP TSG-RAN WG2 meeting #44, Oct. 2004.
Rapporteur (ASUSTeK), "Summary of HFN de-synchronization problem off-line email discussion", R2-050318, 3GPP TSG RAN WG2 #46, Feb. 2005.
ITRI, "Buffer Status Reporting with Group Combining for LTE", R2-072833, 3GPP TSG-RAN-WG2 Meeting #58bis, Jun. 2007.
NEC, "Considerations on Scheduling Information", R2-073556, 3GPP TSG-RAN WG2#59, Aug. 2007.

* cited by examiner

EFFECTIVE SYSTEM INFORMATION RECEPTION METHOD

CROSS REFERENCE TO RELATED APPLICATIONS

Pursuant to 35 U.S.C. §119, the present application claims the benefit of earlier filing date and right of priority to Provisional Application No. 60/945,340, filed Jun. 20, 2007, Provisional Application No. 60/955,651, filed Aug. 14, 2007, and Korean application number 10-2008-0057283, filed Jun. 18, 2008, the contents of which are hereby incorporated by reference herein in their entirety.

BACKGROUND OF THE INVENTION

1. Field of the Invention

The present invention relates to a wireless (radio) communication system for providing wireless communication services and a wireless (radio) terminal, and more particularly, to a method for informing, by the wireless communication system, to the terminal about information required for reception when the wireless terminal is connected to the wireless communication system, in which a base station updates system information according to a preset period, and the terminal efficiently receives or checks any update of the system information based on the period.

2. Description of the Related Art

FIG. 1 shows an exemplary network structure of an Evolved Universal Mobile Telecommunications System (E-UMTS) as a mobile communication system to which a related art and the present invention are applied. The E-UMTS system is a system that has evolved from the UMTS system, and its standardization work is currently being performed by the 3GPP standards organization. The E-UMTS system can also be referred to as a Long-Term Evolution (LTE) system.

The E-UMTS network can roughly be divided into an Evolved Universal Terrestrial Radio Access Network (E-UTRAN) and a Core Network (CN). The E-UTRAN generally comprises a terminal (i.e., User Equipment (UE)), a base station (i.e., eNode B), and an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

Radio interface protocol layers between the terminal and the network can be divided into a first layer (L1), a second layer (L2) and a third layer (L3) based on three lower layers of an Open System Interconnection (OSI) standard model widely known in communications systems. A physical layer belonging to the first layer provides an information transfer service using a physical channel. A Radio Resource Control (RRC) layer located at the lowest portion of the third layer controls radio resources between the terminal and the network. For this purpose, the RRC layer allows RRC messages to be exchanged between the terminal and the network.

FIGS. 2 and 3 show radio interface protocol architecture between a terminal and E-UTRAN based on 3GPP radio access network standards. Particularly, FIG. 2 shows radio protocol architecture in a control plane, and FIG. 3 shows radio protocol architecture in a user plane.

The radio interface protocol in FIGS. 2 and 3 has horizontal layers comprising a physical layer, a data link layer and a network layer, and has vertical planes comprising a user plane for transmitting user traffic and a control plane for transmitting control signals. The protocol layers in FIGS. 2 and 3 can be divided into a first layer (L1), a second layer (L2) and a third layer (L3) based on three lower layers of an Open System Interconnection (OSI) standard model widely known in communications systems. Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side. The physical channel is modulated based on an Orthogonal Frequency Division Multiplexing (OFDM) technique, and utilizes time and frequency as radio resources.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer, in the radio protocol user plane, is used to efficiently transmit IP packets, such as IPv4 or IPv6, on a radio interface with a relatively narrow bandwidth. For this purpose, the PDCP layer reduces the size of an IP packet header which is relatively great in size and includes unnecessary control information, namely, a function called header compression is performed.

A Radio Resource Control (RRC) layer located at the lowest portion of the third layer is only defined in the control plane. The RRC layer controls logical channels, transport channels and physical channels in relation to establishment, re-configuration and release of Radio Bearers (RBs). Here, the RB signifies a service provided by the second layer for data transmissions between the terminal and the E-UTRAN. If an RRC connection is established between the RRC layer of the terminal and the RRC layer of the radio network, the terminal is in the RRC connected mode. Otherwise, the terminal is in an RRC idle mode.

A Non-Access Stratum (NAS) layer located at an upper portion of the RRC layer performs functions, such as session management, mobility management and the like.

One cell constructing an eNB is set to one of bandwidths of 1.25 MHz, 2.5 MHz, 5 MHz, 10 MHz, 20 MHz and the like, so as to provide downlink or uplink transmission services to multiple terminals. Here, different cells may be set to provide different bandwidths.

Downlink transport channels for transmitting data from a network to a terminal may comprise a Broadcast Channel (BCH) for transmitting system information, a Paging Channel (PCH) for transmitting paging messages and a downlink Shared Channel (SCH) for transmitting other user traffic or control messages. Traffic or control messages of a downlink point-to-multipoint service (multicast or broadcast service) may be transmitted either via a downlink SCH, or via a separate downlink Multicast Channel (MCH). In addition, uplink transport channels for transmitting data from a terminal to a network may comprise a Random Access Channel (RACH) for transmitting an initial control message and an uplink Shared Channel (SCH) for transmitting user traffic or control messages.

Logical channels which are located at an upper portion of transport channels and mapped to the transport channels include a Broadcast Control Channel (BCCH), a Paging Control Channel (PCCH), a Common Control Channel (CCCH), a MBMS point-to-multipoint Control Channel/Multicast Control Channel (MCCH), a MBMS point-to-multipoint Traffic Channel/Multicast Traffic Channel (MTCH), and the like.

FIG. 4 shows a transmission on a control channel according to the related art.

A physical channel is composed of multiple sub-frames arranged on a time axis and multiple sub-carriers arranged on a frequency axis. Here, a single sub-frame includes a plurality of symbols on the time axis. One sub-frame is composed of a plurality of resource blocks, each of which includes a plurality of symbols and a plurality of sub-carriers. Also, each sub-frame can use particular sub-carriers of particular symbols (e.g., a first symbol) at the corresponding sub-frame for a Physical Downlink Control Channel (PDCCH), namely, a L1/L2 control channel. One sub-frame is a time duration of 0.5 ms. A Transmission Time Interval (TTI) as a unit time for which data is transmitted is 1 ms corresponding to two sub-frames.

In E-UMTS system, radio resource(s) of in a cell is allocated for an uplink radio resource(s) and a downlink radio resource(s). The base station (eNode B) is in charge of controlling or allocating of the uplink and downlink radio resource(s). Namely, the base station decides which terminal can use which or how much radio resource(s) for which particular time period(s). After such determination is made, the base station transmits those information to a corresponding terminal so that the terminal can perform the uplink or downlink transmission according to the information.

In conventional art, the terminal continuously uses the radio resource(s) in a connected mode. However, in recent years, there are many service based on an IP (Internet Protocol) packet, and continuously using of the radio resource(s) in the connected mode may cause a drawback because these IP packet based service does not always communicates packet(s) all the time, rather there are many periods that packets are not communicated even in the connected mode. As such, continuously allocating and using of the radio resource(s) for whole time period in a connected mode may be ineffective and undesirable. In order to solve this drawback, the radio resource(s) may be allocated only when there is service data to be communicated.

Hereinafter, description of an RRC state of a terminal and a RRC connection method will be given in detail. The RRC state refers to whether the RRC of the terminal is logically connected to the RRC of the E-UTRAN, thereby forming a logical connection with the RRC of the E-UTRAN. If the RRC of the terminal forms a logical connection with the RRC of the E-UTRAN, this is referred to as an "RRC connected state." Conversely, if there is no logical connection between the RRC of the terminal and the RRC of the E-UTRAN, this is referred to as an "RRC idle state." When the terminal is in the RRC connected state and, accordingly, the E-UTRAN can recognize the existence of the corresponding terminal according to units of cells, the E-UTRAN can effectively control the terminal. On the other hand, the E-UTRAN cannot recognize a terminal that is in idle state. The terminal in idle state can be managed by the CN according to units of location areas or units of tracking (routing) areas, which are areas larger than the cell. Specifically, the existence of a terminal in idle state is only recognized according to units of large areas, such as location areas or tracking (routing) areas, and the terminal must transition into the connected state in order to receive typical mobile communication services such as voice or data.

When a user initially turns on the power of the terminal, the terminal first detects an appropriate cell and maintains its idle state in the corresponding cell. The terminal in idle state forms an RRC connection with the RRC of the E-UTRAN through the RRC connection procedure and transitions into the RRC connected state when the RRC connection needs to be formed. There are several instances in which a terminal in idle state is required to form the RRC connection. For example, an uplink data transmission may be required due to a call attempt by a user or the transmission of a response message in response to a paging message received from the E-UTRAN may be required.

Hereinafter, description of system information will be given. The system information may include all information required for a terminal to know for a connection with a base station. Accordingly, before the terminal attempts to connect to the base station, it should receive all system information and always have the most updated system information. In addition, considering that all terminals within one cell should know the system information, the base station periodically transmits the system information.

The system information may be divided into a Master Information Block (MIB), a Scheduling Block (SB), a System Information Block (SIB) and the like. The MIB serves to inform the terminal about a physical construction of a corresponding cell (e.g., a bandwidth, and the like). The SB serves to inform the terminal about transmission information of SIBs (e.g., a transmission period and the like). The SIB refers to a collection (or aggregate) of system information that are related to each other. For instance, some SIB may include information of neighboring cells only, and other SIB may include information about an uplink radio channel only used by the terminal.

In the related art, in order for a terminal to receive appropriate services without causing any trouble in a system, the terminal should always have the most updated system information. However, such system information needs to be received by a terminal which has newly entered into a cell, or a terminal which has been newly turned on in a specific cell. Accordingly, the base station would repeatedly transmit the system information. In this case, requiring the terminal to always receive the system information may cause a problem of unnecessarily wasting power to a terminal which has already received the most updated system information. Accordingly, it is necessary for the terminal to read system information only if the system information is actually modified.

SUMMARY OF THE INVENTION

The present invention is to provide a method for efficiently receiving and updating system information, by a terminal, if the system information is modified, wherein a base station which transmits control information required for a connection with the base station (i.e., system information) to the terminal uses a minimum radio resources of a cell under its management, thereby maximizing efficiency of radio resources as well as minimizing power consumption of the terminal which should receive the control information.

To implement at least the above feature in whole or in parts the present invention may provide a method of receiving system information for an uplink access in a wireless communication system, the method comprising: receiving the system information and period information related to a modification of the system information; determining whether or not the system information needs to be modified; and receiving updated system information according to the period information if the system information is determined to be modified.

The present invention may also provide a method of transmitting system information for an uplink access in a wireless communication system, the method comprising: transmitting the system information and period information related to a modification of the system information; notifying whether or not the system information needs to be modified; and transmitting updated system information according to the period information if the system information is determined to be modified.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

One aspect of the present invention is the recognition by the present inventors regarding the problems and drawbacks of the related art described above and explained in more detail hereafter. Based upon such recognition, the features of the present invention have been developed.

The present invention may be embodied in a 3GPP communication technology, in particular, in the Universal Mobile Telecommunications System (UMTS) system, a communication apparatus and method thereof. However, the present invention may also be applied to all wired/wireless communications to which the technical scope of the present invention can be applied.

Figure 1:
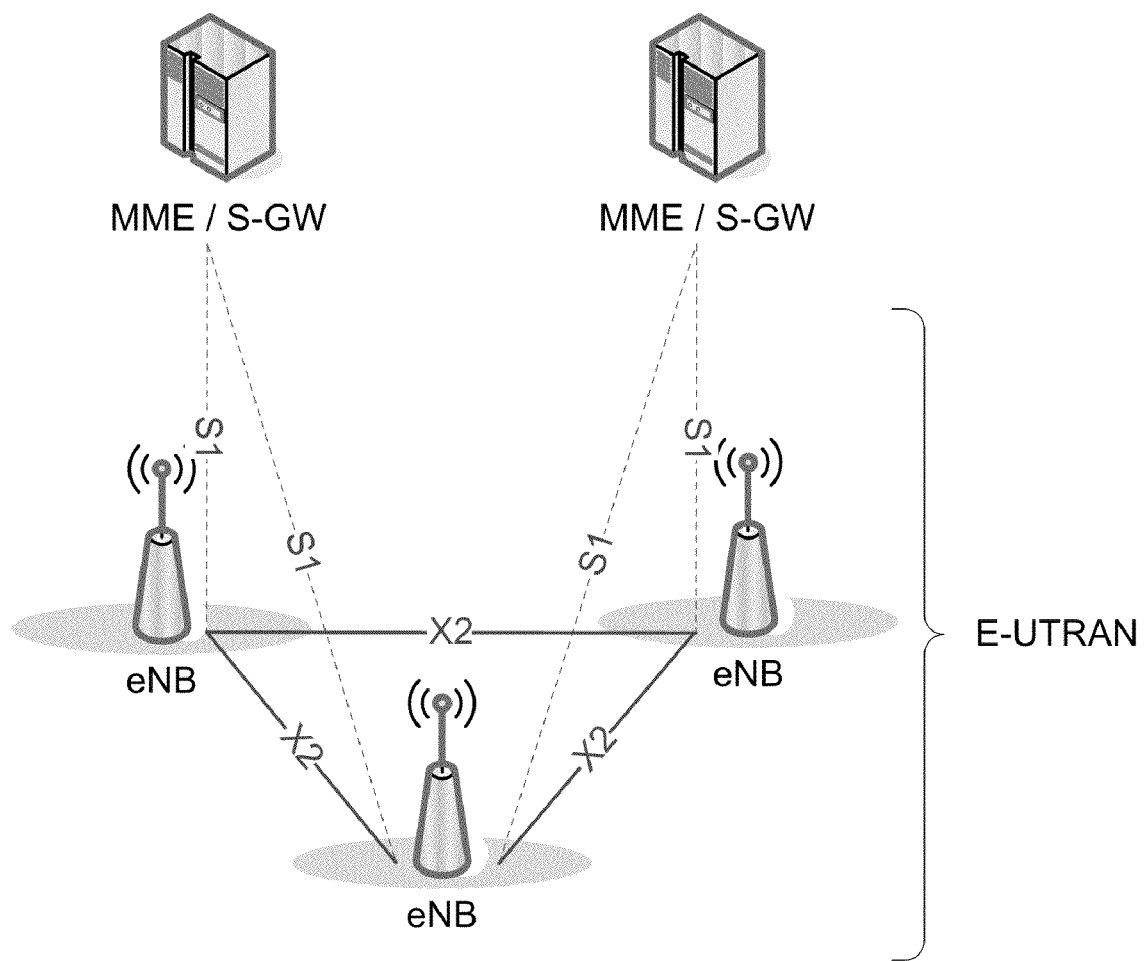
FIG. 1 shows an exemplary network structure of an Evolved Universal Terrestrial Radio Access Network (E-UTRAN) as a mobile communication system to which a related art and the present invention are applied.
Figure 2:
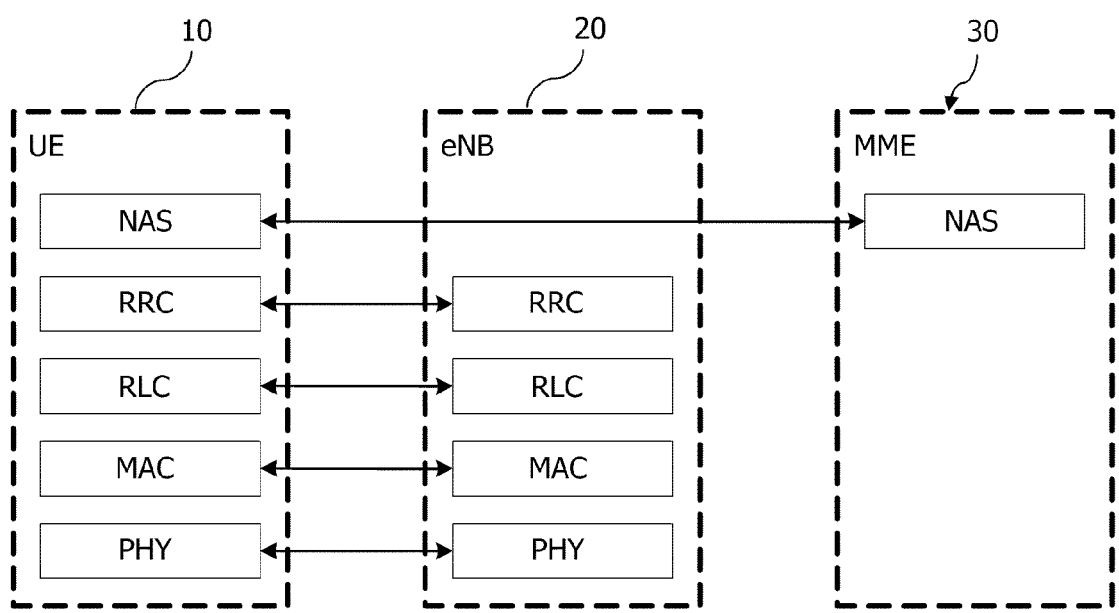
FIG. 2 shows a radio interface protocol architecture in a control plane between a terminal and a Evolved UMTS Terrestrial Radio Access Network (E-UTRAN) based on 3GPP radio access network standards.
Figure 3:
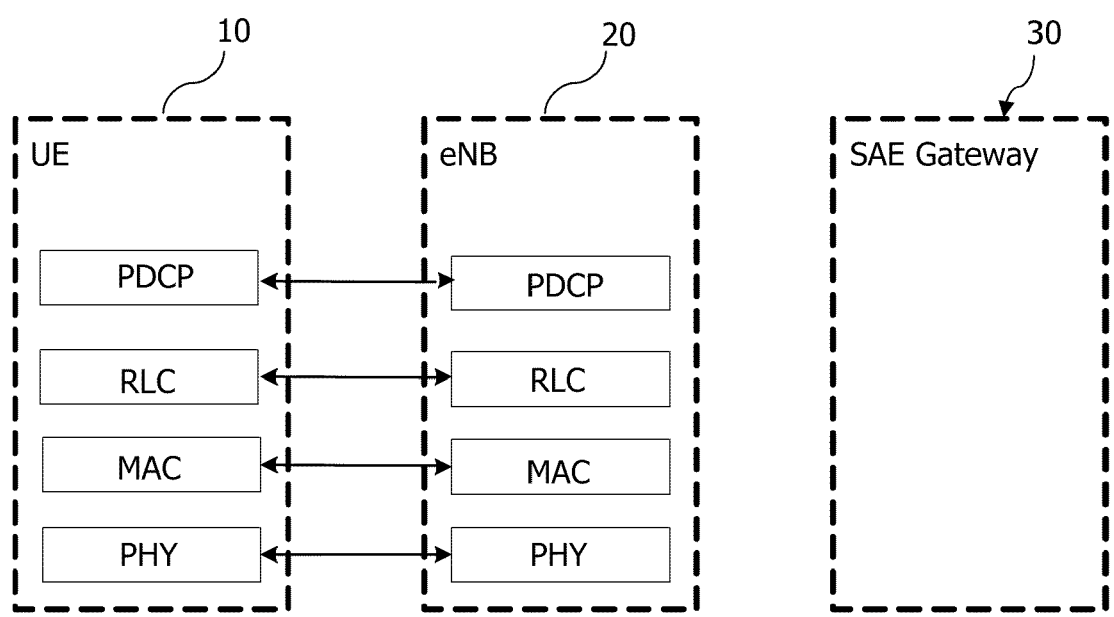
FIG. 3 shows a radio interface protocol architecture in a user plane between a terminal and a Evolved UMTS Terrestrial Radio Access Network (E-UTRAN) based on 3GPP radio access network standards.
Figure 4:
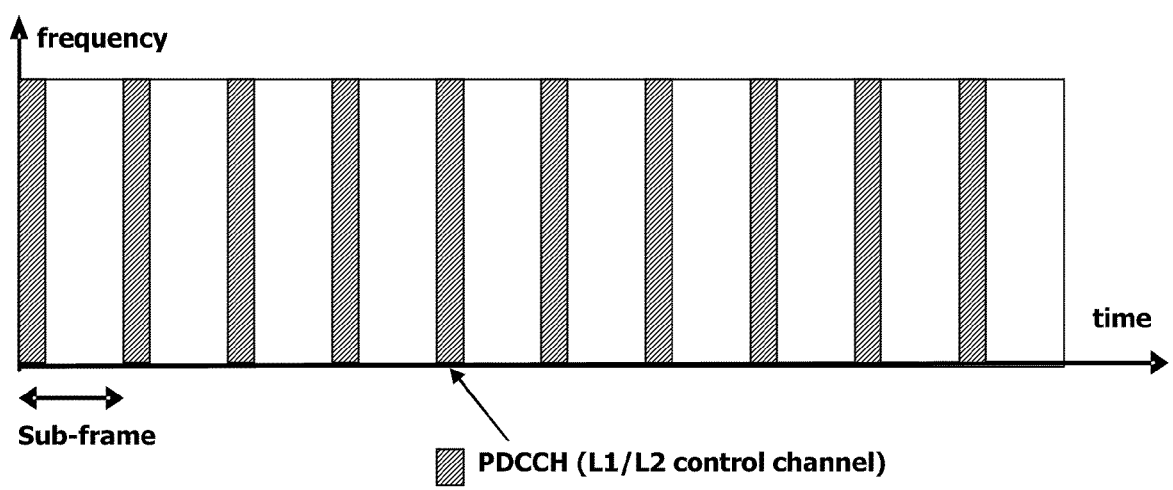
FIG. 4 shows an exemplary view of a related art physical channel structure for control channel transmission.
Figure 5:
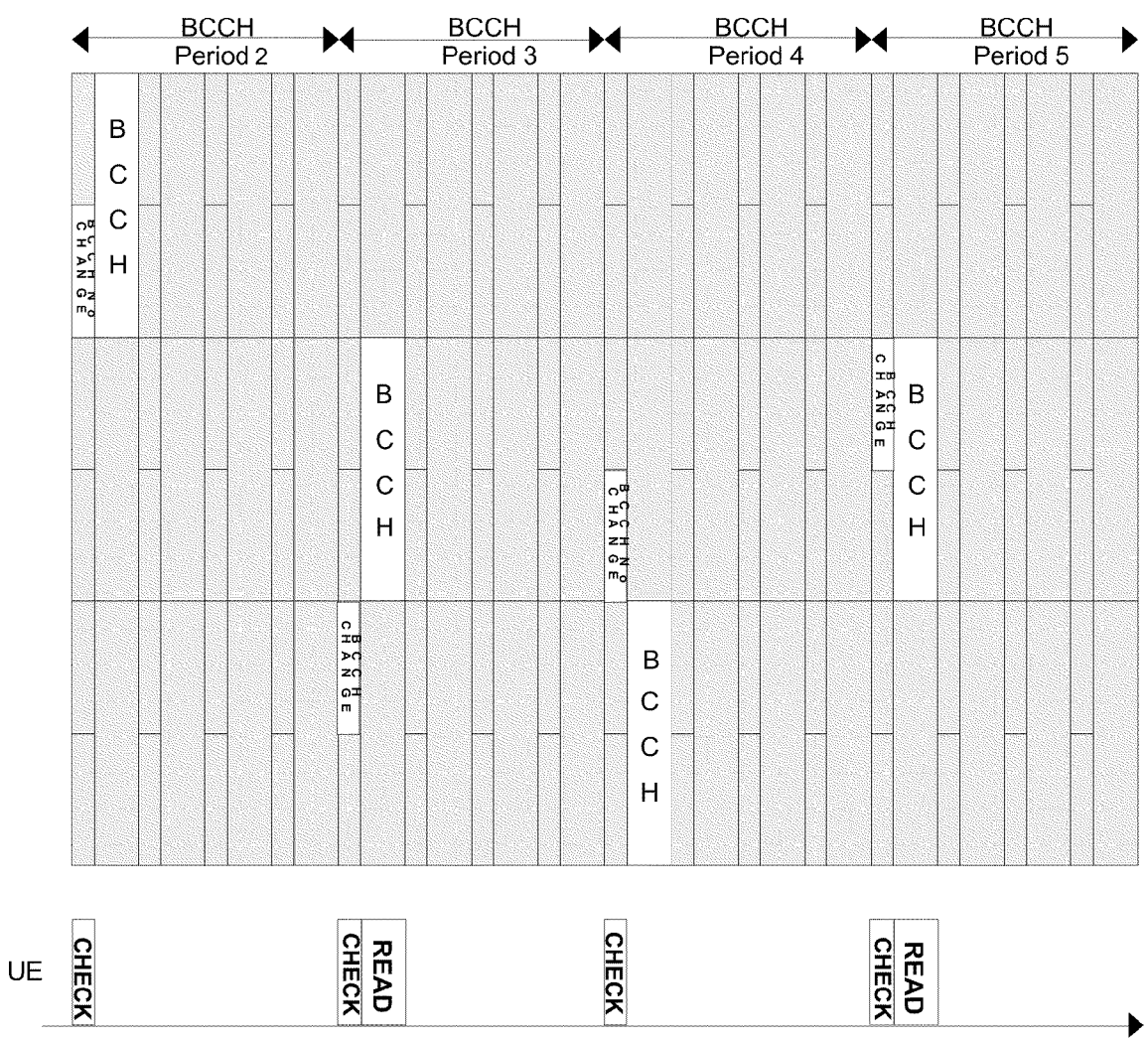
FIG. 5 shows a system information reception process according a first embodiment of the present invention.

Hereinafter, description of structures and operations of the preferred embodiments according to the present invention will be given with reference to the accompanying drawings. FIG. 5 shows an exemplary system information reception process according a first embodiment of the present invention. Referring to FIG. 5, a BCCH period refers to a time period (time duration) in which system information (SI) having the same content is transmitted. That is, the system information is transmitted with the same content in the same BCCH period. More specifically, if system information needs to be modified while being transmitted within a certain BCCH period, such system information may be modified in the next BCCH period or new (modified) system information may be transmitted in the next BCCH period. In FIG. 5, the terminal is notified in the BCCH period 3 that the BCCH has been modified. Accordingly, the terminal considers (determines) that new system information, other than that transmitted in the BCCH period 2, would be transmitted in the BCCH period 3. In FIG. 5, the terminal is notified in the BCCH period 4 that the BCCH is not modified. Accordingly, the terminal determines that the system information having the same content as that transmitted in the previous BCCH period (e.g., in the BCCH period 3) would be transmitted in the BCCH period 4, thereby not receiving the system information. That is, the BCCH period refers to a minimum time interval in which the system information can be modified. In other words, different system information cannot be transmitted within one BCCH period.

Figure 6:
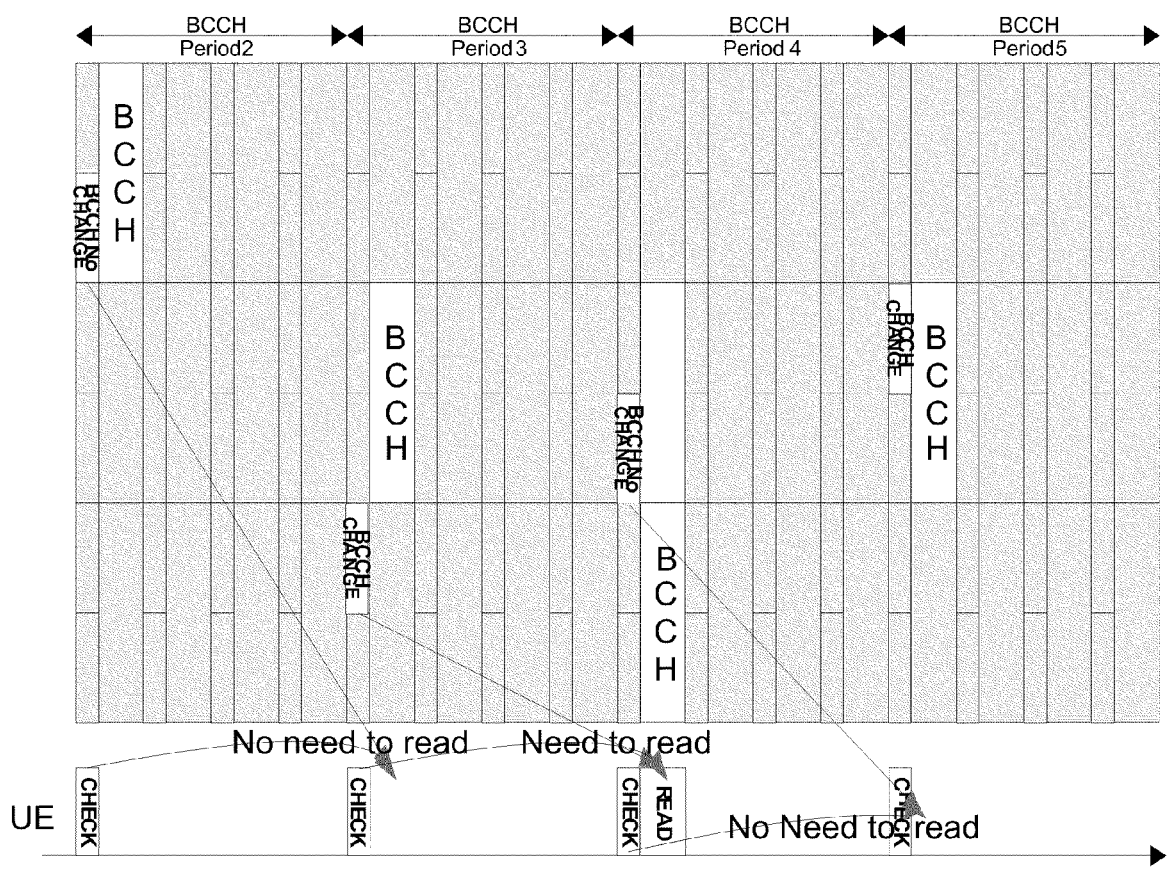
FIG. 6 shows a system information reception process according a second embodiment of the present invention.

FIG. 6 shows an exemplary system information reception process according a second embodiment of the present invention. Referring to FIG. 6, a period (duration) for indicating modification of system information by a base station, and a period (duration) for indicating the start of transmission of newly updated (modified) system information may be set differently. That is, if a modification of system information is indicated in a certain system information modification period, the modified system information can be transmitted in the next system information modification period. More specifically, the base station may inform the terminal that the system information has been modified in a Nth system information modification period, and may transmit the actually modified system information in the next system information modification period.

For instance, if the terminal has obtained information indicating a modification of system information in a certain system information modification period, the terminal may be configured to receive modified system information in the next system information modification period. That is, if the base station informs the terminal about the modification of the system information in the $N^{th}$ system information modification period and, accordingly, the terminal receives such system information, the terminal would actually receive the system information in the next system information modification period.

The present invention is to provide a method for efficiently receiving and updating, by a terminal, system information if the system information is modified, wherein a base station which transmits to the terminal control information required for a connection with the base station (i.e., system information) uses a minimum radio resources of a cell under its management, thereby maximizing efficiency of radio resources as well as minimizing power consumption of the terminal which should receive the control information. For this, the present invention proposes to operate the terminal and the base station by using information regarding a period related to reception or modification of system information. Here, the period related to the reception or modification of the system information refers to a minimum period in which system information can be modified, or a minimum period in which the base station can modify the system information. In addition, the period related to the reception or modification of the system information may also refer to a minimum time in which the base station should wait until the next system information modification after modifying the system information. In addition, the period related to the reception or modification of the system information may refer to a minimum time in which the base station should modify system information and wait until modified system information is to be transmitted, if the base station notifies the terminal that system information has not been modified. The period related to the reception or modification of the system information may refer to a maximum period, in regard to the system information modification, which allows the terminal to check whether or not system information has been modified. The period related to the reception or modification of the system information may refer to a period in which the terminal periodically checks whether or not system information is modified or periodically receives system information. Here, the period related to the reception or modification of the system information may refer to a maximum time which does not need to further receive system information, or a time period without needing to check the modification of the system information after the terminal verifies that system information has not been modified as compared to the previously received system information. Further, the period related to the reception or modification of the system information may refer to a period for starting reception of modified system information after the terminal verifies that system information has been modified when compared to the previously received system information.

The present invention proposes to operate the terminal and the base station by using time information related to reception or modification of system information. Here, the time information related to the reception or modification of the system information may refer to when modified system information, as compared to the previous system information, can be transmitted. In addition, the time information related to the reception or modification of the system information may indicate a starting time when a first portion of modified system information is and/or can be transmitted. The time information related to the reception or modification of the system information may indicate a time when the base station can modify system information or start the transmission of modified system information. The time information related to the reception or modification of the system information may refer to a time when the base station can perform the next modification of system information after having modified the system information. In addition, the time information related to the reception or modification of the system information may indicate a time when the system can start the transmission of actually modified system information, if system information needs to be modified after the system informs the terminal that the system information has not been modified when compared to the previous system information. The time information related to the reception or modification of the system information may refer to a time, in regard to the modification of system information, when the terminal starts checking whether or not system information has been modified. In addition, the time information related to the reception or modification of the system information may refer to a limit time duration (or time period) in which there is no need to receive further system information, or a time when an operation to check whether or not system information modification is to be performed in the next time should be performed after the terminal checks that system information has not been modified when compared to the previously received system information. In addition, the time information related to the reception or modification of the system information may refer to a time when the terminal starts the reception of new (modified) system information after checking that the system information has been modified when compared to the previous system information. The time information related to the reception or modification of the system information may refer to a time when the terminal periodically checks whether or not system information is modified or periodically receives the system information.

The present invention proposes to operate the terminal and the base station by using time period (time duration) information related to reception or modification of system information. Here, the time period information related to the reception or modification of the system information may refer to a time period in which the system information is transmitted a number of times with the same content. System information may be transmitted with the same content or with different content in a certain time period designated by the time period information related to the reception or modification of the system information. The time period information related to the reception or modification of the system information may refer to the next time period which modified system information can be transmitted if the base station desires to change the system information that is being transmitted. Here, the time period information related to the reception or modification of the system information may refer to a unit of time in which the base station can modify system information, or a time period in which the base station can start the transmission of modified system information. Or, it may refer to a time period in which the base station may modify the system information. In addition, the time period information related to the reception or modification of the system information may refer to a time period in which the base station can perform a next modification of system information after changing the system information. In regard to the modification of the system information, it may refer to a time period in which the terminal starts checking whether or not the system information has been changed. The time period information related to the reception or modification of the system information may refer to a time period in which the terminal considers that the system information would be transmitted with the same content, after checking that the system information has not been modified as compared to the previously received system information. Or it may refer to a time period in which an operation should be performed to check whether or not system information modification is to be performed in the next time period. The time period information related to the reception or modification of the system information may refer to a time period in which the terminal periodically checks whether or not system information has been modified or periodically receives the system information.

That is, in the present invention, the base station sets the system information modification periods, and transmits the system information with the same content in the same system information modification period. Accordingly, the base station may transmit system information with different content in different system information modification period only. That is, the system information modification period refers to a time period in which the system information is transmitted with the same content.

In regard to the system information modification period, the base station informs the terminal about information, such as a starting point, a period of time duration, a length of time duration, and the like. Based on such information, the terminal would know information about each of the system information modification periods. Accordingly, in the present invention, the base station is configured to set system information modification periods and notify information related to the system information modification periods. The terminal considers (determines) that system information of the same content is transmitted within the same system information modification period. Accordingly, if it is checked that the system information is not modified in a current system information modification period, the terminal determines that the system information has not been modified in this system information modification period as compared to the previous system information, thereby not reading the system information. In addition, if the terminal checks that the system information has not been modified in the current system information modification period, the terminal checks whether or not the system information would be modified in the next system information modification period. If the system information is determined to be modified in the current system information modification period, the terminal would read the system information. Here, when the system information should be read, the terminal would read such information in the current system information modification period. Accordingly, in the present invention, the base station sets the system information modification periods and notifies information related to such system information modification periods. The system is configured to transmit the system information of the same content within the same system information modification period. Accordingly, if the base station determines that system information should be modified within a certain system information modification period during its transmission, the base station would transmit the system information that are already being transmitted within the current system information modification period, and then transmit modified system information in the next system information modification period.

The system information change may only occur at specific radio frames (i.e., concept of a modification period is used). The system information messages may be transmitted a number of times with the same content within the modification period, as defined by its scheduling. The modification period boundaries are defined by SFN mod N, where N is configured by system information. When the network changes all or some of the system information, it first notifies the terminal (UEs) about this change, and this notification may be done throughout a modification period. The notification may include a radio network temporary identifier (RNTI). In the next modification period, the network may transmit the updated system information. Upon receiving a change notification, the terminal (UE) may know that the current system information is valid until the next modification period boundary. After this boundary, the terminal may acquire the new system information.

The present invention may provide a method of receiving system information for an uplink access in a wireless communication system, the method comprising: receiving the system information and period information related to a modification of the system information; determining whether or not the system information needs to be modified; and receiving updated system information according to the period information if the system information is determined to be modified, wherein the period information comprises at least one of a starting point of a modification period, an ending point of the modification period or total time duration (period) of the modification period, the period information indicates a minimum period in which the system information can be modified, the period information indicates a minimum period in which a base station can change the system information, the period information indicates a minimum time in which the base station should wait for the next updated system information after changing the system information, the period information indicates a maximum period in which the terminal checks whether or not the system information has been modified, the period information indicates a starting time to receive the modified system information, the modified system information is also received in the certain modification period when the period information is received in a certain modification period, the modified system information is received in another modification period, other than the certain modification period when the period information is received in a certain modification period, or the modified system information is received in the next modification period after the certain modification period when the period information is received in a certain modification period.

It can be also said that the present invention also provide a method of transmitting system information for an uplink access in a wireless communication system, the method comprising: transmitting the system information and period information related to a modification of the system information; notifying whether or not the system information needs to be modified; and transmitting updated system information according to the period information if the system information is determined to be modified, wherein the period information comprises at least one of a starting point of a modification period, an ending point of the modification period or total time duration (period) of the modification period, the period information indicates a minimum period in which the system information can be modified, the period information indicates a minimum period in which a base station can change the system information, the period information indicates a minimum time in which the base station should wait for the next updated system information after changing the system information, the period information indicates a maximum period in which the terminal checks whether or not the system information has been modified, the period information indicates a starting time to transmit the modified system information, the modified system information is also transmitted in the certain modification period when the period information is transmitted in a certain modification period, the modified system information is transmitted in another modification period, other than the certain modification period when the period information is transmitted in a certain modification period, or the modified system information is transmitted in the next modification period after the certain modification period when the period information is transmitted in a certain modification period.

Namely, the present invention has an effect of efficiently receiving and updating, by the terminal, system information if the system information is modified, in which the base station which transmits to the terminal control information required for a connection with the base station (i.e., system information) uses a minimum radio resources of a cell under its management, thereby maximizing efficiency of radio resources as well as minimizing power consumption of the terminal which should receive the control information.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of receiving updated system information in a wireless communication system, the method comprising:
   receiving system information comprising a value;
   receiving, by a terminal via a downlink shared control channel, a notification for changing of the system information, wherein the notification is one of a plurality of notifications that are each received during one of a plurality of modification periods, wherein each period of the plurality of modification periods has boundaries which are defined based on a System Frame Number (SFN) and the value of the system information;
   determining, for each of the plurality of modification periods, if there is a change in the system information based on the received notification;
   if there is a change in the system information, then receiving, by the terminal, an updated system information during a modification period of the plurality of modification periods, wherein the updated system information is received via a downlink shared data channel;
   wherein changes of the system information only occur at respective modification periods of the plurality of modification periods.

2. The method of claim 1, wherein each period of the plurality of modification periods is a Broadcast Control Channel (BCCH) modification period.

3. The method of claim 1, wherein the notification is received through a current Broadcast Control Channel (BCCH) modification period, and the updated system information is received within a next BCCH modification period.

4. The method of claim 1, wherein the notification is received through a current Broadcast Control Channel (BCCH) modification period and the updated system information is received within the current BCCH modification period.

5. The method of claim 1, wherein when there is no change in the system information, current system information is valid until a next modification period, of the plurality of modification periods.

6. The method of claim 1, wherein the modification period indicates a minimum period in which the system information can be modified.

7. The method of claim 1, wherein the modification period indicates a minimum period in which a network can change the system information.

8. The method of claim 1, wherein the modification period indicates a minimum time in which a network should wait for a next updated system information after changing the system information.

9. The method of claim 1, wherein the modification period indicates a maximum period in which the terminal determines if there is a change in the system information.

10. The method of claim 1, wherein each period of the plurality of modification periods defines a minimum period during which the system information is not changed.

11. The method of claim 1, wherein the notification comprises a radio network temporary identifier (RNTI).

12. The method of claim 1, wherein the value of the system information permits definition of at least one of a starting point, a period of time duration, or length of time duration, of each modification period of the plurality of modification periods.

13. The method of claim 1, wherein a number of notifications received during the modification period is not greater than 1.

14. A method of transmitting updated system information in a wireless communication system, the method comprising:
- transmitting, by a network, system information comprising a value;
- transmitting, by the network via a downlink shared control channel, a notification for changing of the system information, wherein the notification is one of a plurality of notifications that are each transmitted during one of a plurality of modification periods, wherein each period of the plurality of modification periods has boundaries which are defined based on a System Frame Number (SFN) and the value of the system information;
- transmitting by the network, when there is a change in the system information, an updated system information during a modification period of the plurality of modification periods, wherein the updated system information is transmitted via a downlink shared data channel;
- wherein the transmitting of the updated system information occurs a number of times with the same content within the modification period; and
- wherein changes of the system information only occur at respective modification periods of the plurality of modification periods.

15. The method of claim 14, wherein each period of the plurality of modification periods is a Broadcast Control Channel (BCCH) modification period.

16. The method of claim 14, wherein the notification is transmitted through a current Broadcast Control Channel (BCCH) modification period and the updated system information is transmitted within a next BCCH modification period.

17. The method of claim 14, wherein the notification can be transmitted through a current Broadcast Control Channel (BCCH) modification period and the updated system information is transmitted within the current BCCH modification period.

18. The method of claim 14, wherein the modification period boundaries are defined by System Frame Number (SFN).

19. The method of claim 14, wherein when there is no change in the system information, current system information is valid until a next modification period, of the plurality of modification periods.

20. The method of claim 14, wherein the modification period indicates a minimum period in which the system information can be modified.

21. The method of claim 14, wherein the modification period indicates a minimum period in which the network can change the system information.

22. The method of claim 14, wherein the modification period indicates a minimum time in which the network should wait for the next updated system information after changing the system information.

23. The method of claim 14, wherein the modification period indicates a maximum period in which the terminal determines if there is a change in the system information.

* * * * *